United States Patent [19]
Naito et al.

[11] 3,730,953
[45] May 1, 1973

[54] PROCESS FOR PRODUCING HIGH MOLECULAR POLYURETHANES BY REACTING OXADIAZINONES WITH POLYOLS IN THE PRESENCE OF AN ORGANOTIN CATALYST

[75] Inventors: Kenji Naito; Kiyoshi Yasuda, both of Osaka, Japan

[73] Assignee: Takeda Chemical Industries Ltd., Osaka, Japan

[22] Filed: Dec. 7, 1971

[21] Appl. No.: 205,714

[30] Foreign Application Priority Data

Dec. 28, 1970 Japan...................................45/124073

[52] U.S. Cl.........260/77.5 AM, 252/182, 252/431 R, 252/431 C, 252/431 N, 260/75 NB, 260/2.5 AB
[51] Int. Cl. .............................................C08g 22/42
[58] Field of Search ..................260/77.5 AB, 75 NB, 260/9 R, 77.5 B; 252/431 R, 431 C, 431 N, 182

[56] References Cited

FOREIGN PATENTS OR APPLICATIONS

| | | | |
|---|---|---|---|
| 4,418,877 | 8/1969 | Japan | 260/77.5 AB |
| 1,419,914 | 10/1965 | France | 260/77.5 AB |
| 1,145,952 | 3/1969 | Great Britain | 260/77.5 AB |

*Primary Examiner*—Donald E. Czaja
*Assistant Examiner*—M. J. Welsh
*Attorney*—Paul M. Craig, Jr. et al.

[57] ABSTRACT

A process for producing high molecular polyurethane compounds having wide uses as coating materials, resins and foams. The high molecular compounds are produced by reacting an oxadiazinone compound, which has been obtained by the reaction of an organic isocyanate compound with carbon dioxide, with a polyol compound in the presence of a catalyst of such a specific organotin compound as tetrabutyl-1,3-diacetoxydistannoxane.

21 Claims, No Drawings

PROCESS FOR PRODUCING HIGH MOLECULAR POLYURETHANES BY REACTING OXADIAZINONES WITH POLYOLS IN THE PRESENCE OF AN ORGANOTIN CATALYST

This invention relates to a process for producing high molecular compounds. More particularly, the invention pertains to an improvement in a process for producing high molecular compounds from polyol compounds and oxadiazinone compounds obtained by the reaction of organic isocyanates with carbon dioxide. The high molecular compounds obtained according to the process of the present invention are classified into polyurethane compounds which have wide uses as, for example, coating materials, resins and foams.

British Pat. No. 1,145,952 teaches a process for preparing high molecular compounds by reacting aliphatic polyisocyanates with carbon dioxide in the presence of a catalyst, e.g., a trialkylphosphine, to form oxadiazinone compounds containing free isocyanates groups, and then reacting said oxadiazinone compounds with active hydrogen compounds in the presence of zinc octylate.

As to the reaction of an oxadiazinone compound with an active hydrogen compound, the present inventors have found the following facts:

For example, in case of a compound (A) having two NCO groups, the terminal NCO groups first react with the active hydrogen compound HX to form a compound (B), and the thus formed compound (B) further reacts with said HX to give a compound (C).

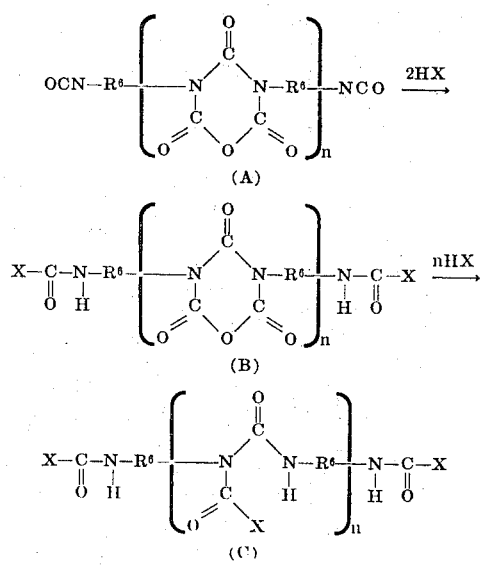

Among the above reactions, the former proceeds easily, but the latter is extremely slow, in general, so that the reaction system is required to be heated at a high temperature for a long period of time, and the product tends to suffer from air oxidation or thermal degradation. Further, when the (B) → (C) reaction is effected on the surface of a fiber or the like high molecular material, there are some cases where the substrate high molecular material is deteriorated.

The present inventors have found that the (B) → (C) reaction can be greatly promoted by using specific tin compounds as catalysts. Further, the use of said specific tin compounds results in such advantage that useful high molecular compounds like the above-mentioned (C) can be obtained on commercial scale also from oxadiazinone compounds containing no free NCO groups.

The present invention provides a process for the commercial scale production of high molecular compounds having such uses as mentioned previously.

The present invention relates to a process for producing high molecular compounds which comprises reacting an oxadiazinone compound obtained by the reaction of an organic isocyanate compound with a carbon dioxide with a polyol compound in the presence of an organotin compound represented by the formula,

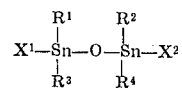

wherein $R^1$, $R^2$, $R^3$ and $R^4$ are individually an alkyl group having one to eight carbon atoms, and may be same or different; and $X^1$ and $X^2$ are individually a halogen atom, a hydroxyl group, an alkoxy group having one to four carbon atoms, an isothiocyanate group, a carboxylic acyloxy group containing a carboxyl group having 0 to 17 carbon atoms, and may be same or different, excluding the case where both $X^1$ and $X^2$ are hydroxyl groups. In the above-mentioned $X^1$ and $X^2$, the halogen atom includes chlorine, bromine and iodine atoms; the alkoxy group includes $CH_3O-$, $C_2H_5O-$, $C_3H_7O-$ and $C_4H_9O-$; and the carboxylic acyloxy group includes formyloxy, acetoxy, propionoyloxy, butyroyloxy, hexanoyloxy, lauroyloxy and stearoyloxy groups.

A. Starting materials

A-1. Organic isocyanate:

As the organic isocyanate, any of the known organic isocyanates may be used so far as it contains one or more NCO groups in one molecule. Particularly, the use of diisocyanate is advantageous. As the known organic isocyanates, there are aliphatic and aromatoaliphatic organic isocyanates.

The aliphatic monoisocyanates are isocyanates having one to eight carbon atoms. Examples of such isocyanates include methyl, ethyl, butyl, pentyl, hexyl and octyl isocyanates.

The aliphatic diisocyanates include those shown by the formulas, a. OCN-alkylene-NCO
(wherein the alkylene has two to nine carbon atoms), b. OCN-alkylene-O-alkylene-NCO
(wherein the alkylene has two to four carbon atoms), c. 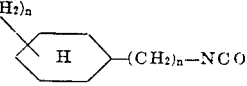

(wherein $n$ is 1 or 2), d. OCN—⟨H⟩—(CH₂)ₙ—⟨H⟩—NCO (wherein $n$ is 1 or 2), and e. 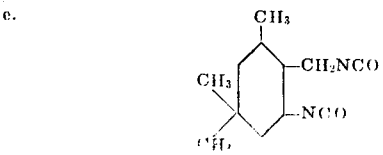

Examples of such diisocyanates include ethylene diisocyanate, hexamethylene diisocyanate, trimethyl hexamethylene diisocyanate, tetramethylene diisocyanate, 2-ethylhexylyene-1,6-diisocyanate, dimethylcyclohexane-ω,ω'-diisocyanate, diethylcyclohexane-ω,ω'4,4'-diisocyanate, dicyclohexylethane-4,4'-diisocyanate, isophoronediisocyanate, diethyl ether-ω,ω'-diisocyanate, dipropyl ether-ω,ω'-diisocyanate and dibutyl ether-ω,ω'-diisocyanate.

The aromatoaliphatic organic isocyanates are isocyanates of the formulas, a. 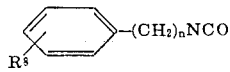

(wherein n is 1 or 2, and $R^8$ is $CH_3$, Cl or $NO_2$), and b. 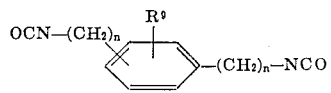

(wherein n is 1 or 2, and $R^9$ is H or $CH_3$).

Examples of such isocyanates include benzyl isocyanate, phenethyl isocyanate, dimethylbenzene-ω,ω'-diisocyanate, diethylbenzene-ω,ω'-diisocyanate and diethylxylene-ω,ω'-diisocyanate.

In the present process, there may also be used prepolymers having terminal NCO groups which are obtained by reacting an excess amount of such polyisocyanates as mentioned above with low molecular weight polyol components having about 62 to about 3,000 of molecular weight. Examples of the above-mentioned low molecular weight polyol components include ethylene glycol, propylene glycol, diethylene glycol, polypropylene glycol, polyethylene glycol, 2,2,4-trimethylpentane-1,3-diol, glycerin, trimethylolpropane, hexanetriol, sorbitol and sucrose. Further, there may be used such compounds that the isocyanates groups in the above-mentioned organic polyisocyanate have partly been blocked by a blocking agent. As the blocking agent, any of the known blocking agents may be used. Still further, there may be used as well such compounds that the isocyanate groups in the above-mentioned organic polyisocyanates have partly been dimerized or trimerized.

A-2. carbon dioxide:

The carbon dioxide may be used in any form, but is desirably free from oxygen and water as far as possible.

A-3. Polyol compound:

The polyol compound used in the present invention is a compound having two or more hydroxyl groups per molecule. Further, the polyol compound may be low or high in molecular weight, the molecular weight being about 60 to about 10,000 or higher. Typical examples of the polyol compound include ethylene glycol, diethylene glycol, propylene glycol, dipropylene glycol, 2,2,4-trimethylpentane--diol, glycerin, hexanetriol, trimethylolpropane, pentaerythritol, sorbitol, sucrose, cellulose and polyvinylalcohol; polyether polyols obtained by addition-polymerizing oxirane compounds such as ethylene oxide, propylene oxide, butylene oxide, styrene oxide, epichlorohydrin and epibromohydrin to the above-mentioned polyols; and polyester polyols obtained by reacting polycarboxylic acids such as adipic, phthalic, isophthalic, maleic, fumaric and the like acids or anhydrides thereof with the above-mentioned polyols.

A-4. Catalyst:

The catalyst used in the present invention is a tetraalkyl distannoxane derivative represented by the formula,

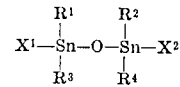

wherein $R^1$, $R^2$, $R^3$ and $R^4$ are individually an alkyl group having one to eight carbon atoms, and may be same or different; and $X^1$ and $X^2$ are individually a halogen atom, a hydroxyl group, an alkoxy group having one to four carbon atoms, an NCS group, or a carboxylic acyloxy group containing a carboxyl group having 0 to 17 carbon atoms, and may be same or different, excluding the case where both $X^1$ and $X^2$ are hydroxyl groups; said halogen atom including Cl, Br, I and the like atoms, said alkoxy group including $CH_3O-$, $C_2H_5O-$, $C_3H_7O-$, $C_4H_9O-$ and the like groups; and said carboxylic acyloxy group including formyloxy, acetoxy, propionoyloxy, butyroyloxy, hexanoyloxy, lauroyloxy, stearoyloxy and the like groups. The tetraalkyl distannoxane derivative can be prepared according to the method disclosed in Chemical Abstracts 65, P 12240f (1966), 66, P 46485c (1967), 67, P 108759b (1967), 67, P 108760v (1967), and in "Proceedings of the Chemical Society" (1961) pages 457 – 458 and "Journal of Organometallic Chemistry" Vol. 1, No. 1, pages 81 –88 (1963).

The stannoxane compound can form the following dimeric structure, particularly in the state of crystalline:

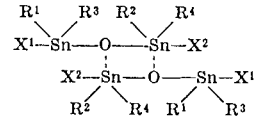

Throughout the present specification and claims, these stannoxane compounds are simply shown as monomer compounds, namely tetraalkyl distannoxane compounds.

Examples of the tetraalkyl distannoxane derivative are as follows:

1. Tetra-butyl-1,3-diacetoxy-distannoxane
2. Tetra-butyl-1,3-distearoyloxy-distannoxane
3. Tetra-butyl-1,3-diformyloxy-distannoxane
4. Tetra-butyl-1,3-di-(2-ethyl-hexanoyloxy)-distannoxane
5. Tetra-butyl-1-chloro-3-hydroxy-distannoxane
6. Tetra-propyl-1-chloro-3-hydroxy-distannoxane
7. Tetra-butyl-1,3-dilauroyloxy-distannoxane
8. Tetra-ethyl-1-chloro-3-hydroxy-distannoxane
9. Tetra-methyl-1-chloro-3-hydroxy-distannoxane
10. Tetra-propyl-1,3-diacetoxy-distannoxane
11. Tetra-ethyl-1,3-diacetoxy-distannoxane
12. Tetra-methyl-1,3-distearoyloxy-distannoxane
13. Tetra-methyl-1,3-diacetoxy-distannoxane
14. Tetra-butyl-1-hydroxy-3-acetoxy-distannoxane
15. Tetra-butyl-1-hydroxy-3-formyloxy-distannoxane
16. Tetra-propyl-1-hydroxy-3-acetoxy-distaanoxane
17. Tetra-butyl-1-hydroxy-3-lauroyloxy-distannoxane
18. Tetra-ethyl-1-hydroxy-3-acetoxy-distannoxane
19. Tetra-ethyl-1-hydroxy-3-(2-ethyl-hexanoyloxy)-distannoxane 20. Tetra-butyl-1-chloro-3-methoxy-distannoxane
21. Tetra-butyl-1-chloro-3-ethoxy-distannoxane
22. Tetra-butyl-1-chloro-3-propoxy-distannoxane
23. Tetra-propyl-1-chloro-3-methoxy-distannoxane
24. Tetra-ethyl-1-chloro-3-methoxy-distannoxane
25. Tetra-butyl-1,3-diisothiocyanato-distannoxane
26. Tetra-ethyl-1,3-diisothiocyanato-distannoxane
27. Tetra-propyl-1,3-diformyloxy-distannoxane
28. Tetra-ethyl-1,3-diformyloxy-distannoxane
29. Tetra-methyl-1,3-diformyloxy-distannoxane
30. Tetra-methyl-1-acetoxy-3-hydroxy-distannoxane
31. Tetra-ethyl-1-formyloxy-3-hydroxy-distannoxane
32. Tetra-propyl-1-formyloxy-3-hydroxy-distannoxane
33. Tetra-butyl-1-methoxy-3-acetoxy-distannoxane
34. Tetra-butyl-1-methoxy-3-formyloxy-distannoxane
35. Tetra-butyl-1-ethoxy-3-acetoxy-distannoxane
36. Tetra-butyl-1-ethoxy-3-stearoyloxy-distannoxane
37. Tetra-butyl-1-ethoxy-3-formyloxy-distannoxane
38. Tetra-propyl-1-methoxy-3-acetoxy-distannoxane
39. Tetra-butyl-1-propoxy-3-acetoxy-distannoxane
40. Tetra-propyl-1-methoxy-3-lauroyloxy-distannoxane
41. Tetra-butyl-1,3-dichloro-distannoxane
42. 1,3-dimethyl-1,3-dibutyl-1,3-diacetoxy-distannoxane
43. 1,3-dibutyl-1,3-dioctyl-1-chloro-3-hydroxy-distannoxane
44. 1,1-diethyl-3,3-dibutyl-1-isothiocyanate-3-methoxy-distannoxane
45. 1,1-diisobutyl-3,3-dipropyl-1-lauroyloxy-3-butoxy-distannoxane
46. 1-methyl-1,3,3-tributyl-1-bromo-3-hydroxy-distannoxane
47. 1-methyl-1-butyl-3-isopropyl-3-hexyl-1,3-dibutyloxy-distannoxane B. Reactions B-1. Reaction of organic isocyanate with carbon dioxide:

This reaction may be represented by the following equation:

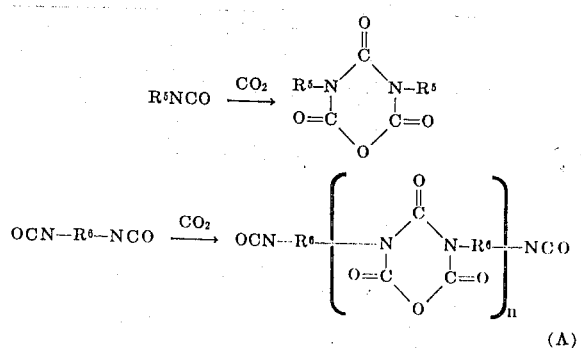

(A)

(wherein $R^5$ and $R^6$ are an organic isocyanate residue).

This reaction may be conducted after a conventional manner, for example, the method described in British Pat. No. 1,145,952. The following is a typical example of the concrete explanation of the method for this reaction. Ordinarily, carbon dioxide is injected into the reaction system by use of gas inlet pipe. This reaction is usually conducted in the presence of an organic phosphorus compound such as triethylphosphine, tributylphosphine, diethyl phosphine, etc. as a catalyst. The amount of carbon dioxide varies depending on the kinds of the starting materials and of the organic phosphorus compound used, but is ordinarily from about 5 to 5,000 mole percent, practically from about 10 to 500 mole percent, based on the amount of the organic isocyanate.

The reaction is effected in the presence or absence of a solvent. As the solvent, any of benzene, toluene, xylene, ethyl acetate, acetone and ether, for example, is suitably used. The reaction temperature varies within a considerably wide range depending on the kinds of the starting materials and of the organic phosphorus compound used. Generally, however, a temperature from about −40° to about 150°C., preferably from about −20° to about 100°C., is suitably adopted.

The amount of the organic phosphorus compound varies depending on the kinds thereof and of the organic isocyanate used, but is ordinarily from about 0.001 to about 10 percent by weight, preferably from about 0.01 to about 3 percent by weight, based on the amount of the organic isocyanate.

According to infrared spectrum and nuclear magnetic resonance spectrum, it is inferred that an organic isocyanate derivative produced in the above-mentioned manner has the fundamental skeletal structure,

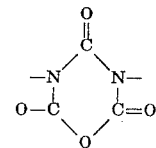

For example, in case an organic monoisocyanate has been used, it is inferred that the produce has the general formula,

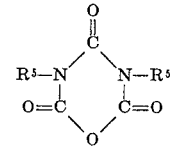

wherein $R^5$ is the organic monoisocyanate residue; and in case of using diisocyanate, it is inferred that the product has the general formula,

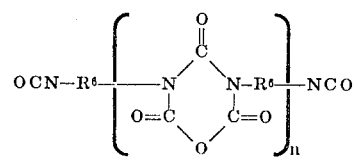

wherein $R^6$ is the organic diisocyanate residue used; and $n$ is a positive number of ordinarily 1 to 2.

Further, in case there has been used an isocyanate which has partly been blocked, it is considered that the blocked isocyanate groups is left as it is in the product.

The thus obtained organic isocyanate derivative is isolated or not isolated from the reaction system, and then subjected to the reaction with the polyol compound. There are some cases where unaltered starting isocyanate is partly present in the reaction product. However, the reaction product may be subjected to the subsequent reaction without removing such unaltered isocyanate.

The isolation of the organic isocyanate derivative produced may suitably be effected according to a procedure known per se, e.g., by removing the solvent from the reaction mixture.

B-2. Reaction of oxadiazinone compound with polyol:

In the present method, when an oxadiazinone compound prepared from carbon dioxide and a monoisocyanate is used, a polyol containing at least three OH groups per molecule is desirably used as a polyol component, and in this case, a linear high molecular compound is produced.

On the other hand, when an oxadiazinone compound prepared from carbon dioxide and a polyisocyanate containing at least two NCO groups per molecule is used, the polyol component to be used may be any of polyols containing at least two OH groups per molecule to give substantially equal results or effect, and in this case, there is produced a cross-linked high molecular compound.

The reaction may, for example, be illustrated as follows:

a. In case of using a polyol and an oxadiazinone compound prepared from carbon dioxide and a monoisocyanate:

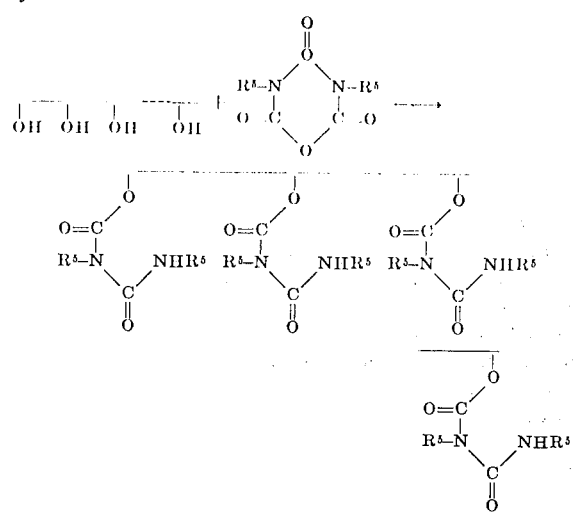

b. In case of using a glycol and an oxadiazinone compound prepared from carbon dioxide and a diisocyanate:

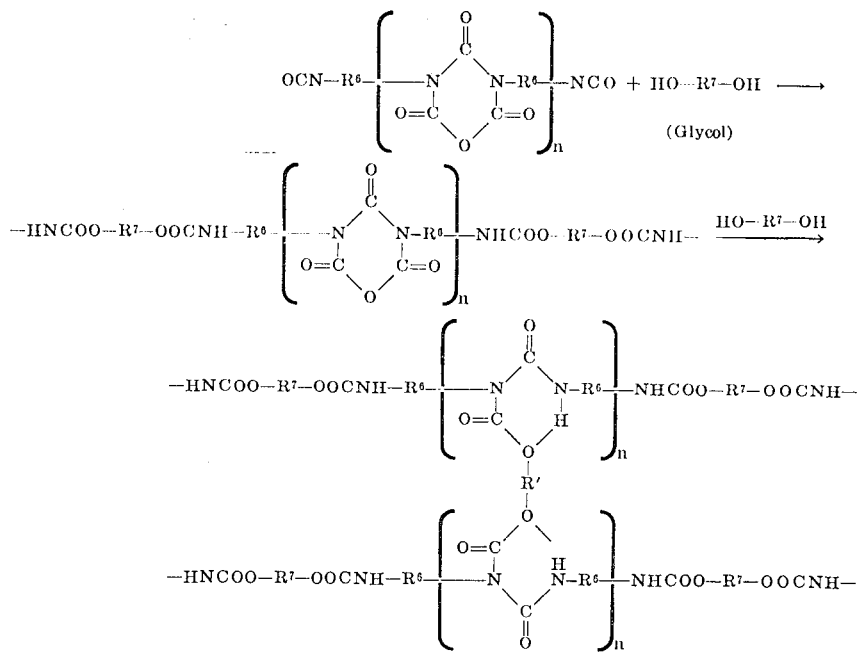

The reaction is effected at a temperature in the range from −20° to 120°C., preferably from 70° to 130°C. The reactants are used in substantially equivalent amounts, though the polyol compound is sometimes used in great excess. The reaction may be carried out either in the presence or absence of a solvent. As the solvent, toluene, butyl acetate, ethyl acetate, xylene, benzene, acetone, methylethylketone or dioxane is used.

The amount of the catalyst to be added is in the range from about 0.001 to 5 percent by weight, preferably from about 0.01 to 2 percent by weight, based on the weight of the oxadiazinone compound. The catalyst is added before initiation of the reaction of oxadiazinone compound with polyol compound. In case said isocyanate derivative has two NCO groups, the catalyst may be added after substantial completion of the first stage reaction shown in the aforesaid reaction schema. The catalyst is used in the form of a solution in such a solvent as mentioned above. The catalyst, when it is in the crystalline form, is present in the form of a dimer, as mentioned previously. In the solution, however, it is not clear in what form is present the catalyst. Probably, there might exist such an equilibrium as shown below.

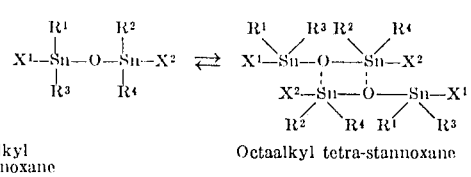

tetraalkyl distannoxane    Octaalkyl tetra-stannoxane

The high molecular compound obtained by the present invention can be used as coating agents, molding materials, adhesive agents, finishing agents for fibrous materials, etc.

For instance, the oxadiazinone compound is mixed with the polyol and the catalyst, and the mixture is applied on a suitable substrate after a conventional manner, followed by heating. By this process, a coating layer is formed on the substrate; a fibrous material is treated with a mixture of the polyol, the catalyst and the oxadiazinone compound after a conventional manner, followed by heating, whereby the fibrous materials are improved in their properties; a mixture of the polyol, the catalyst and the oxadiazinone compound is put in a suitable mold, the mold is heated and then the resulting material is taken out of the mold, whereby a molded article of a suitable shape is obtained.

The following example illustrates the invention.

EXAMPLE 1

A solution of 10.0 g of dimethylbenzene-ω,ω'-diisocyanate in 16.0 g of toluene was incorporated with 0.05 g of tributylphosphine and reacted at room temperature for 3 hours while introducing dry carbon dioxide at a rate of 100 cc/min., and then the reaction system was degasified under reduced pressure. The weight of the solution increased by 0.94 g, and the NCO group content thereof became 10.0 percent (17.2 percent before the reaction). This indicates that 2 gram moles of NCO group had reacted per mole of carbon dioxide.

After removing the toluene from the solution under reduced pressure, the resulting compound showed maximum absorptions in infrared absorption spectrum analysis at 2,250 (medium), 1,852 (medium), 1,760 (strong) and 1,720 (strong) $cm^{-1}$. From this, it was understood that the compound contained —NCO, C=O and

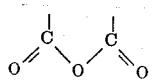

groups. On the other hand, the nuclear magnetic resonance spectrum (deuterated DMSO solution) of the compound showed strong absorptions in a ratio of 3 : 2 : 5 in the vicinity of 5.4, 5.1 and 2.7, respectively, in terms of τ values. From the above results, it was understood that the said compound was an organic polyisocyanate derivative represented by the general formula (D),

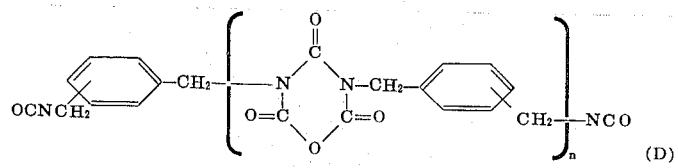

wherein $n$ is 0 or an integer of 1 or more, and the average value is 0.67.

2.6 grams of the thus obtained compound was reacted at 80°C. for 50 minutes with 10.0 g. of polypropylene glycol having a molecular weight of 1,000 in the presence of 3 mg of tetrabutyl-1,3-diazetoxy-distannoxane to give a polymer. In this polymer, a conversion rate of NCO groups to allophanate group was 70 percent and that to urethane groups was 100 percent.

When the above procedure was conducted without using the distannoxane component, the conversion rate of NCO groups to allophanate groups and to urethane groups were 4 percent and 50 percent, respectively.

EXAMPLE 2

To a solution of 133 g of benzyl isocyanate in 200 ml of ethyl ether was added 4 g of tributyl phosphine, and then carbon dioxide was introduced into the solution for 4 hours at a rate of 100 cc/min., whereby the weight of the above mixture became 149 g.

Elementary analysis
Calculated for $C_{17}H_{14}O_4N_2$
C 65.81, H 4.55, N 9.03
Found
C 66.04, H 4.65, N 8.98

The resulting compound showed maximum absorptions infrared absorption spectrum analysis at 2,250 (medium), 1,832 (medium), 1,780 (strong) and 1,720 (strong) $cm^{-1}$. From this, it was understood that the compound contained —NCO, >C=C and 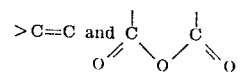

groups. On the other hand, the nuclear magnetic resonance spectrum (deuterated DMSO solution) of the compound showed strong absorptions in a ratio of 4 : 10 in the vicinity of 5.11 and 2.66 respectively, in terms of τ value. From the above result, it was understood that the said compound was an organic isocyanate derivative represented by the general formula (E);

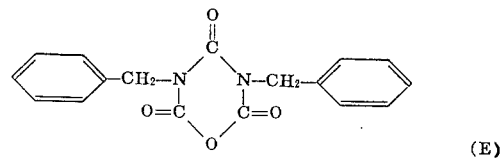

To a solution of 5 g of the compound (I) obtained above in 20 ml of acetone were added 3 g of cellulose and 30 mg of tetrabutyl-1-acetoxy-3-hydroxy-distannoxane, and the mixture was heated at 80°C for 20 minutes. The treated cellulose weighed 3.5 g and showed maximum absorptions in infrared absorption spectrum analysis at 1,715 (strong) and 1,680 (strong) $cm^{-1}$. From this, it was understood that the compound contained

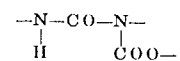

group. This fact shows that the above compound (E) is chemically reacted with the cellulose by allophanate linkages.

On the other hand, when the similar treatment to the above was conducted without using tetrabutyl-1-acetoxy-3-hydroxy-distannoxane, the above maximum absorptions were not observed in the treated cellulose.

EXAMPLE 3

2.6 g of compound (D) obtained in Example 1 was allowed to react with 10.0 g of polypropylene glycol (Molecular weight: 1,000) in the absence or presence of various catalysts for 50 minutes at 80°C. Conversion rates of NCO to allophanate group and of NCO to urethane group were measured in the resulting polymers. The result are shown in the following table.

| Catalyst | AMOUNT of catalyst (mg) | Conversion rate of NCO to urethane group (%) | Conversion rate of NCO to allophanate group (%) |
|---|---|---|---|
| tetrabutyl-1,3-di-acetoxy-distannoxane | 2.9 | 100 | 70 |
| tetrabutyltin | 3.5 | 50 | 4 |
| trimethyltin hydroxide | 1.8 | 60 | 6 |
| diethyltin diacetate | 2.9 | 70 | 15 |
| monobutyltin trichloride | 2.8 | 55 | 6 |
| stannous octoate | 3.5 | 75 | 29 |
| lead stearate | 7.7 | 72 | 22 |
| cobalt octoate | 4.9 | 55 | 5 |
| copper octoate | 3.5 | 55 | 4 |
| manganese octoate | 4.8 | 50 | 4 |
| iron chloride | 1.6 | 60 | 5 |
| cadmium chloride | 1.8 | 70 | 10 |
| ethylorthovanadate | 2.0 | 60 | 7 |
| — | 0 | 50 | 4 |

EXAMPLE 4

To a solution of 15 g of hexamethylene diisocyanate in 15 g of toluene was added 0.1 g of 1,4-dicyclohexyl-1,4-diphosphacyclohexane, and dry carbon dioxide was introduced into the mixture at a rate of 100 cc/min. at −20°C for 4 hours, whereby viscous liquid having NCO content of 16.8 percent (NCO content was 25.0 percent before the reaction) was obtained with increase in weight by 1.18 g. It was understood by the same manner as in Example 1 that this liquid was an organic polyisocyanate derivative represented by the formula (F);

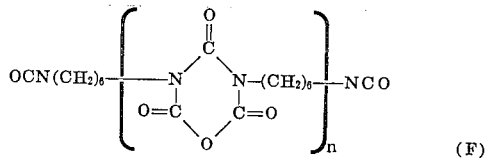

(F)

It was also understood that the average value of $n$ was about 0.43.

5 g of the compound (F) and 7.2 g of polyesterpolyol having 5.7 percent of hydroxyl groups, which was obtained by reacting phthalic acid with trimethylolpropane, were dissolved in 10 g of butyl acetate. To the above solution was added 5 mg of tetrabutyl-1-chloro-3-hydroxy-distannoxane, and the mixture was applied on an iron plate, followed by drying. Thus obtained film was cured only by heating at 70°C for 30 minutes. On the other hand, a film obtained by the same manner as above except for using no tetrabutyl-1-chloro-3-hydroxy-distannoxane was not cured before heating at 70°C for 8 hours.

EXAMPLE 5

A mixture of 101 g of dimethylbenzene-w,w'-diisocyanate (0.54 mole) and 1.58 g of 2,2,4-trimethyl-1,3-pentanediol (0.18 mole) was heated at 60°C for 8 hours under stirring, whereby a reaction product of NCO content of 3.09 percent was obtained. To the above reaction product were added 33 g. of butyl acetate and 0.22 ml of tri-n-butyl phosphine. Into the mixture was introduced under stirring dry carbon dioxide at a rate of 500 cc/min. for 1.5 hours. 0.33 ml of dimethyl sulfate was added to the reaction mixture to give a transparent viscous liquid which was soluble in butyl acetate and acetone. Analysis of this product showed that 33 percent of the total NCO group existing before the reaction was converted to urethane linkages, 35 percent of that was converted to oxadiazinone ring, and 32 percent of that remained as free NCO groups as such. To 4 g of the product obtained above was added 1.03 g of polypropylene glycol (hydroxyl number: 56), and then the mixture was heated at 50°C. for 20 minutes in the absence or presence of various catalysts described below. After this reaction, conversion rate of NCO to allophanate group was measured. Result is shown below.

| Catalyst | Amount of catalyst (mg) | Conversion rate of NCO to allophanate (%) |
|---|---|---|
| tetramethyl-1-isothiocyanato-3-methoxy-distannoxane | 4 | 70 |
| tetrapropyl-1-lauroyloxy-3-butoxy-distannoxane | 10 | 80 |
| tetraoctyl-1-bromo-3-methoxy-distannoxane | 12 | 50 |
| tetraethyl-1,3-diisothiocyanato-distannoxane | 6 | 57 |
| 1,3-dimethyl-1,3-dibutyl-1,3-dioctyl-distannoxane | 10 | 80 |
| — | — | 5 |

We claim:

1. A process for producing high molecular compounds which comprises reacting an oxadiazinone compound obtained by reacting an organic isocyanate compound with carbon dioxide, with a polyol having at least 2 hydroxyl groups in the presence of an organotin compound having the formula,

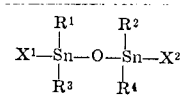

wherein $R^1$, $R^2$, $R^3$ and $R^4$ are individually an alkyl group having one to eight carbon atoms, and may be the same or different; and $X^1$ and $X^2$ are individually a halogen atom, a hydroxyl group, an alkoxy group having one to four carbon atoms, an isothiocyanate group, a formyloxy group or a carboxylic acyloxy group containing a carboxyl group having two to 18 carbon atoms, and may be the same or different, provided that when either $X^1$ or $X^2$ is hydroxyl, the other $X^1$ or $X^2$ is selected from the group consisting of a halogen atom, an alkoxy group having one to four carbon atoms, an isothiocyanate group, a formyloxy group or a carboxylic acyloxy group containing a carboxyl group having two to 18 carbon atoms.

2. A process according to claim 1, wherein, in the formula representing the organotin compound, the halogen atom is a chlorine, bromine or iodine atom; the alkoxy group is $CH_3O-$, $C_2H_5O-$, $C_3H_7O-$ or $C_4H_9O-$; and the carboxylic acyloxy group is a formyloxy, acetoxy, propionyloxy, butyroyloxy, hexanoyloxy, lauroyloxy or stearoyloxy group.

3. A process according to claim 1, wherein the organotin compound is selected from the group consisting of:
tetra-butyl-1,3-diacetoxy-distannoxane,
tetra-butyl-1,3-distearoyloxy-distannoxane,
tetra-butyl-1,3-diformyloxy-distannoxane,
tetra-butyl-1,3-di-2-ethyl-hexanoyloxy-distannoxane,
tetra-butyl-1-chloro-3-hydroxy-distannoxane,
tetra-propyl-1-chloro-3-hydroxy-distannoxane,
tetra-butyl-1,3-dilauroyloxy-distannoxane,
tetra-ethyl-1-chloro-3-hydroxy-distannoxane,
tetra-methyl-1-chloro-3-hydroxy-distannoxane,
tetra-propyl-1,3-diacetoxy-distannoxane,
tetra-ethyl-1,3-diacetoxy-distannoxane,
tetra-methyl-1,3-distearoyloxy-distannoxane,
tetra-methyl-1,3-diacetoxy-distannoxane,
tetra-butyl-1-hydroxy-3-acetoxy-distannoxane,
tetra-butyl-1-hydroxy-3-formyloxy-distannoxane,
tetra-propyl-1-hydroxy-3-acetoxy-distannoxane,
tetra-butyl-1-hydroxy-3-lauroyloxy-distannoxane,
tetra-ethyl-1-hydroxy-3-acetoxy-distannoxane,
tetra-ethyl 1-hydroxy-3-(2-ethyl-hexanoyloxy)-distannoxane,
tetra-butyl-1-chloro-3-methoxy-distannoxane,
tetra-butyl-1-chloro-3-ethoxy-distannoxane,
tetra-butyl-1-chloro-3-propoxy-distannoxane,
tetra-propyl-1-chloro-3-methoxy-distannoxane,
tetra-ethyl-1-chloro-3-methoxy-distannoxane,
tetra-butyl-1,3-diisothiocyanato-distannoxane,
tetra-ethyl-1,3-diisothiocyanato-distannoxane,
tetra-propyl-1,3-diformyloxy-distannoxane,
tetra-ethyl-1,3-diformyloxy-distannoxane,
tetra-methyl-1,3-diformyloxy-distannoxane,
tetra-methyl-1-acetoxy-3-hydroxy-distannoxane,
tetra-ethyl-1-formyloxy-3-hydroxy-distannoxane,
tetra-propyl-1-formyloxy-3-hydroxy-distannoxane,
tetra-butyl-1-methoxy-3-acetoxy-distannoxane,
tetra-butyl-1-methoxy-3-formyloxy-distannoxane,
tetra-butyl-1-ethoxy-3-acetoxy-distannoxane,
tetra-butyl-1-ethoxy-3-stearoyloxy-distannoxane,
tetra-butyl-1-ethoxy-3-formyloxy-distannoxane,
tetra-propyl-1-methoxy-3-acetoxy-distannoxane,
tetra-butyl-1-propoxy-3-acetoxy-distannoxane,
tetra-propyl-1-methoxy-3-lauroyloxy-distannoxane,
tetra-butyl-1,3-dichloro-distannoxane,
1,3-dimethyl-1,3-dibutyl-1,3-diacetoxy-distannoxane,
1,3-dibutyl-1,3-dioctyl-1-chloro-3-hydroxy-distannoxane,
1,1-diethyl-3,3-dibutyl-1-isothiocyanate-3-methoxy-distannoxane,
1,1-diisobutyl-3,3-dipropyl-1-lauroyloxy-3-butoxy-distannoxane,
1-methyl-1,3,3-tributyl-1-bromo-3-hydroxy-distannoxane and
1-methyl-1-butyl-3-isopropyl-3-hexyl-1,3-dibutyloxy-distannoxane.

4. A process according to claim 1, wherein the organotin compound is selected from the group consisting of:
tetra-butyl-1,3-diacetoxy-distannoxane,
tetra-butyl-1-acetoxy-3-hydroxy-distannoxane,
tetra-butyl-1-chloro-3-hydroxy-distannoxane, and
tetra-butyl-1-acetoxy-3-methoxy-distannoxane.

5. A process according to claim 1, wherein the organotin compound is used in an amount from about 0.001 to 5 percent by weight based on the weight of the oxadiazinone compound.

6. A process according to claim 1, wherein the organotin compound is used in an amount from about 0.01 to 2 percent by weight based on the weight of the oxadiazinone compound.

7. A process according to claim 1, wherein the reaction of the polyol with the oxadiazinone compound is effected at a temperature in the range from 70° to 130°C.

8. A process for producing high molecular compounds which comprises reacting an oxadiazinone compound shown by the general formula:

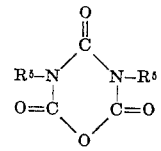

wherein $R^5$ is a radical obtained by removing a —NCO group from an organic monoisocyanate compound, with a polyol having at least 2 hydroxyl groups in the presence of an organotin compound having the formula:

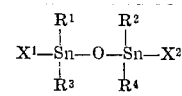

wherein $R^1$, $R^2$, $R^3$ and $R^4$ are individually an alkyl group having one to eight carbon atoms, and may be the same or different; and $X^1$ and $X^2$ are individually a halogen atom, a hydroxyl group, an alkoxy group having one to four carbon atoms, an isothiocyanate group, a formyloxy group or a carboxylic acyloxy group containing a carboxyl group having two to 18 carbon atoms, and may be the same or different, provided that when either $X^1$ or $X^2$ is hydroxyl, the other $X^1$ or $X^2$ is selected from the group consisting of a halogen atom, an alkoxy group having one to four carbon atoms, an isothiocyanate group, a formyloxy group or a carboxylic acyloxy group containing a carboxyl group having two to 18 carbon atoms.

9. A process according to claim 8, wherein $R^5$ is an alkyl having one to eight carbon atoms or a radical of

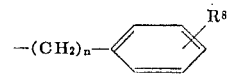

(wherein $n$ is 1 or 2 and $R^8$ is $CH_3$, Cl or $NO_2$).

10. A process for producing high molecular compounds which comprises reacting an oxadiazinone compound obtained by reacting an organic isocyanate compound shown by the general formula:

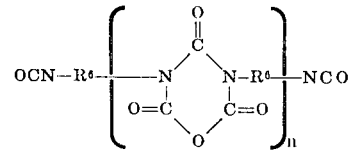

wherein $R^6$ is a radical obtained by removing two NCO groups from an organic diisocyanate compound and $n$ is a positive number of 1 to 2, with a polyol having at least two hydroxyl groups in the presence of a catalytic amount of an organotin compound having the formula:

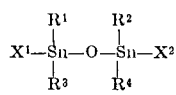

wherein $R^1$, $R^2$, $R^3$ and $R^4$ are individually an alkyl group having one to eight carbon atoms, and may be the same or different; and $X^1$ and $X^2$ are individually a halogen atom, a hydroxyl group, an alkoxy group having one to four carbon atoms, an isothiocyanate group, a formyloxy group or a carboxylic acyloxy group containing a carboxyl group having two to 18 carbon atoms, and may be the same or different, provided that when either $X^1$ or $X^2$ is hydroxyl, the other $X^1$ or $X^2$ is selected from the group consisting of a halogen atom, an alkoxy group having one to four carbon atoms, an isothiocyanate group, a formyloxy group or a carboxylic acyloxy group containing a carboxyl group having two to 18 carbon atoms.

11. A process according to claim 10, wherein $R^6$ is a radical of alkylene having two to nine carbon atoms, -alkylene-O-alkylene-(wherein alkylene has two to four carbon atoms),

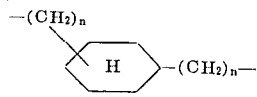

(wherein $n$ is 1 or 2),

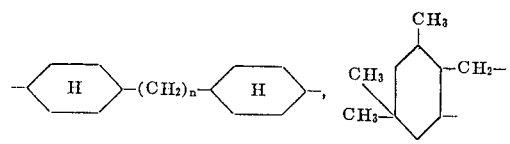

or

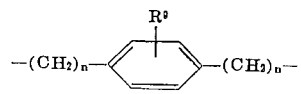

(wherein $n$ is 1 or 2 and $R^9$ is H or $CH_3$).

12. A process according to claim 1, wherein the oxadiazinone compound is that prepared from carbon dioxide and an organic polyisocyanate containing at least three NCO groups per molecule.

13. A process according to claim 1, wherein the polyol is ethylene glycol, diethylene glycol, propylene glycol, dipropylene glycol, 2,2,4-trimethylpentane-1,3-diol, glycerin, hexanetriol, trimethylpropane, pentaerythritol, sorbitol, sucrose, cellulose or polyvinylalcohol.

14. A process according to claim 1, wherein the polyol is a polyether polyol or a polyester polyol.

15. The process according to claim 1 wherein the organotin compound is present in a catalytic amount.

16. A composition comprising an oxadiazinone compound obtained by reacting an organic isocyanate compound with carbon dioxide, a polyol having at least two hydroxyl groups and an organic compound having the formula,

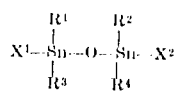

wherein $R^1$, $R^2$, $R^3$ and $R^4$ are individually an alkyl group having one to eight carbon atoms, and may be the same or different; and $X^1$ and $X^2$ are individually a halogen atom, a hydroxyl group, an alkoxy group having one to four carbon atoms, an isothiocyanate group, a formyloxy group or a carboxylic acyloxy group containing a carboxyl group having two to 18 carbon atoms, and may be the same or different, provided that when either $X^1$ or $X^2$ is hydroxyl, the other $X^1$ or $X^2$ is selected from the group consisting of a halogen atom, a hydroxyl group, an alkoxy group having one to four carbon atoms, an isothiocyanate group, a formyloxy group or a carboxylic acyloxy group containing a carboxyl group having two to 18 carbon atoms.

17. A composition comprising oxadiazinone compound obtained by reacting an organic isocyanate compound with carbon dioxide, and an organic compound having the formula:

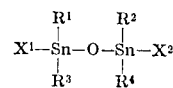

wherein $R^1$, $R^2$, $R^3$ and $R^4$ are individually an alkyl group having one to eight carbon atoms, and may be the same or different; and $X^1$ and $X^2$ are individually a halogen atom, a hydroxyl group, and alkoxy group having one to four carbon atoms, an isothiocyanate group, a formyloxy group or a carboxylic acyloxy group containing a carboxyl group having two to 18 carbon atoms, and may be the same or different, provided that when either $X^1$ or $X^2$ is hydroxyl, the other $X^1$ or $X^2$ is selected from the group consisting of a halogen atom, an alkoxy group having one to four carbon atoms, an isothiocyanate group, a formyloxy group or a carboxylic acyloxy group containing a carboxyl group having two to 18 carbon atoms.

18. A process for producing high molecular compounds which comprises reacting an oxadiazinone compound obtained by reacting an organic isocyanate compound with from about 5 to 5,000 mole percent based on the amount of said isocyanate, of carbon dioxide, in the presence of an organic phosphorus compound; with a polyol having at least two hydroxyl groups in the presence of a catalytical amount of an organotin compound having the formula,

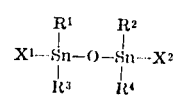

wherein $R^1$, $R^2$, $R^3$ and $R^4$ are individually an alkyl group having one to eight carbon atoms, and may be the same or different; and $X^1$ and $X^2$ are individually a halogen atom, a hydroxyl group, an alkoxy group having one to four carbon atoms, an isothiocyanate group, a formyloxy group or a carboxylic acyloxy group containing a carboxyl group having two to 18 carbon atoms, and may be the same or different, provided that when either $X^1$ or $X^2$ is hydroxyl, the other $X^1$ or $X^2$ is selected from the group consisting of halogen atom, an alkoxy group having one to four carbon atoms, an isothiocyanate group, a formyloxy group or a carboxylic acyloxy group containing a carboxyl group having two to 18 carbon atoms.

19. The process according to claim 18 wherein substantially equal amounts of the oxadiazinone and the polyol are used.

20. The process according to claim 18 wherein the organic isocyanate is a monoisocyanate and the polyol contains at least three hydroxyl groups per molecule.

21. The process according to claim 18 wherein the organic phosphorus compound is selected from the group consisting of triethyl phosphine, tributylphosphine, diethyl phosphine, and 1,4-dicyclohexyl-1,4-diphosphacyclohexane.

* * * * *